(12) United States Patent
Jiang et al.

(10) Patent No.: US 7,254,119 B2
(45) Date of Patent: Aug. 7, 2007

(54) INTERWORKING MECHANISM BETWEEN CDMA2000 AND WLAN

(75) Inventors: James Jiang, Richardson, TX (US); Yonggang Fang, San Diego, CA (US); Rajesh Bhalla, Westmont, IL (US); Mary Chion, Belle Mead, NJ (US)

(73) Assignee: ZTE San Diego, Inc., San Diego, CA (US)

( * ) Notice: Subject to any disclaimer, the term of this patent is extended or adjusted under 35 U.S.C. 154(b) by 698 days.

(21) Appl. No.: 10/447,654

(22) Filed: May 28, 2003

(65) Prior Publication Data

US 2004/0114553 A1    Jun. 17, 2004

Related U.S. Application Data

(60) Provisional application No. 60/383,938, filed on May 28, 2002.

(51) Int. Cl.
*H04Q 7/00* (2006.01)

(52) U.S. Cl. .............. 370/328; 370/338; 370/352; 370/400

(58) Field of Classification Search ............ 370/328, 370/338, 352, 400, 908; 455/465, 432, 557, 455/432.2
See application file for complete search history.

(56) References Cited

U.S. PATENT DOCUMENTS

| 6,243,581 | B1* | 6/2001 | Jawanda ............... 455/432.2 |
| 6,538,606 | B2* | 3/2003 | Quinn et al. ............ 343/702 |
| 7,035,664 | B2* | 4/2006 | Kim .................. 455/553.1 |
| 2002/0085516 | A1 | 7/2002 | Bridgelall |
| 2002/0152342 | A1* | 10/2002 | Das et al. ................ 710/117 |
| 2003/0065805 | A1 | 4/2003 | Barnes, Jr. |
| 2003/0133421 | A1* | 7/2003 | Sundar et al. ........... 370/328 |
| 2003/0134650 | A1* | 7/2003 | Sundar et al. ........... 455/465 |

* cited by examiner

*Primary Examiner*—CongVan Tran
(74) *Attorney, Agent, or Firm*—Fish & Richardson P.C.

(57) ABSTRACT

Interconnection and integration of a WWAN and a WLAN to provide continuous packet data services to mobile users where each mobile access terminal is configured to support both air links with the WWAN and WLAN. The WWAN may be a CDMA2000 system and the WLAN may be an IEEE 802.11 system.

32 Claims, 17 Drawing Sheets

WLAN Protocol Stack with DHCP

AT

PDSN

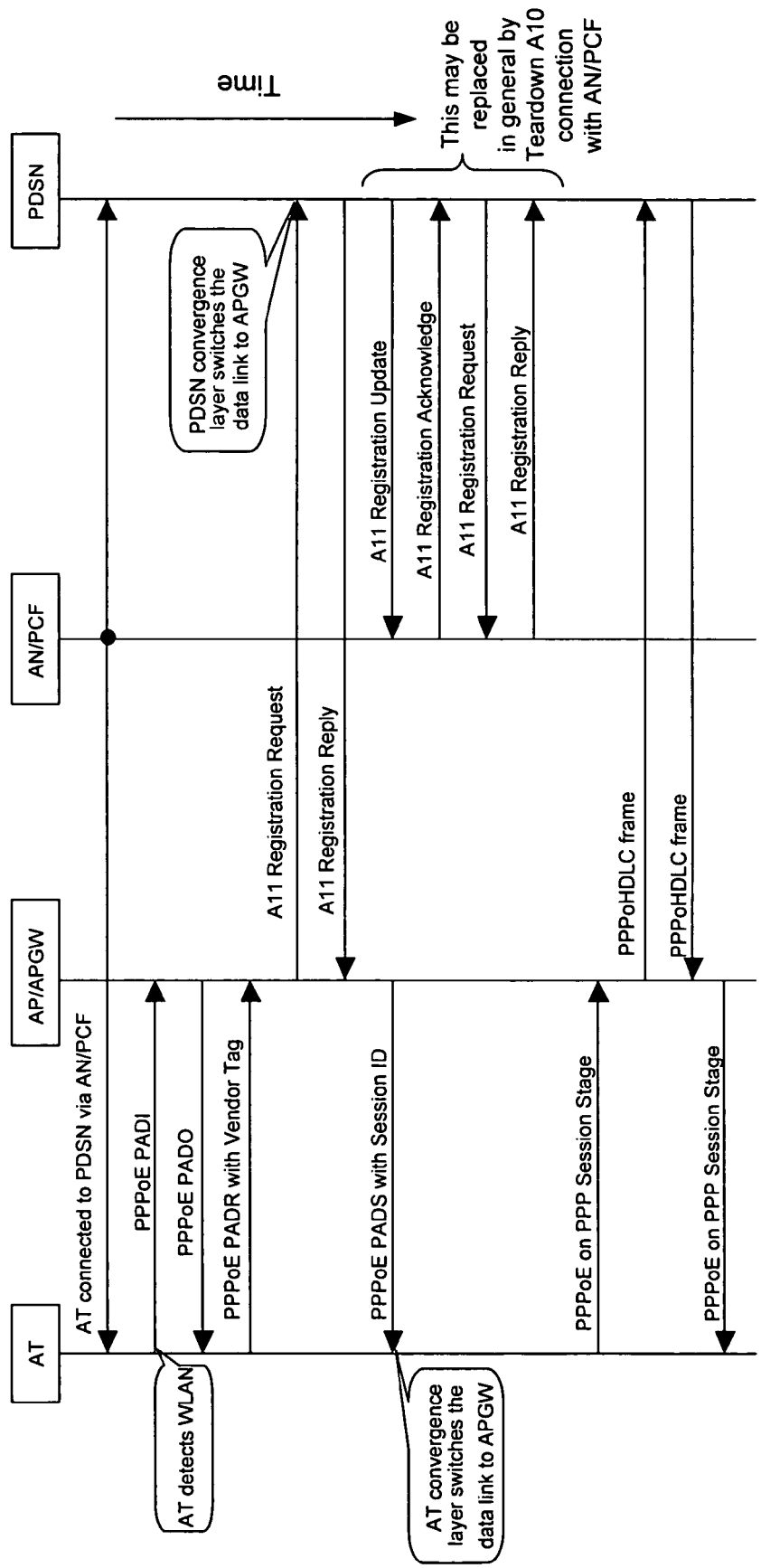
FIG. 9A  Intra-PDSN Dormant Handoff To WLAN

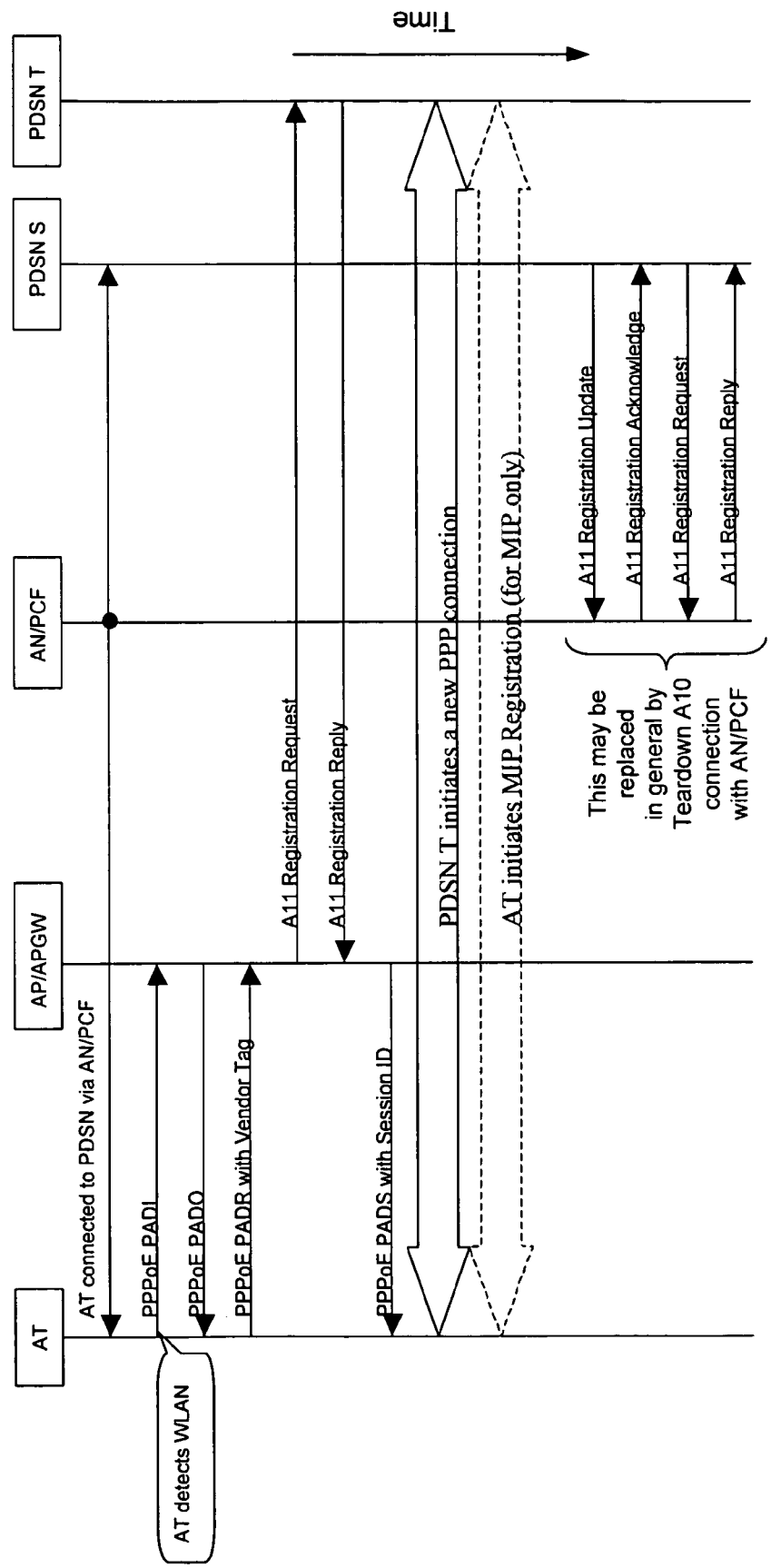
FIG. 9B    Inter-PDSN Dormant Handoff To WLAN

INTERWORKING MECHANISM BETWEEN CDMA2000 AND WLAN

This application claims the benefit of U.S. Provisional Application No. 60/383,938, entitled "Dynamic WWAN and WLAN interface and System" and filed by Jianping Jiang and Yonggang Fang on May 28, 2002, the entire disclosure of which is incorporated herein by reference as part of this application.

BACKGROUND

This application relates to wireless communication systems and techniques.

Wireless communication systems use electromagnetic radio waves to provide communication with and between mobile communication devices known as access terminals (ATs), such as mobile phones and portable computers equipped with wireless communication ports. Different types of wireless communication systems have been developed to provide different wireless communication applications. A wireless wide area network (WWAN), for example, may be designed to provide both voice and data services for mobile communication devices in a large geographical area, e.g., a nationwide network. One example of such a WWAN is a code division multiple access (CDMA) communication system that includes a regular voice or data call handling mechanism and a packet data handling mechanism for handling data packet services. The regular voice or data call handling mechanism includes base transceiver stations (BTSs) distributed in spatially divided cells and a network of base station controllers (BSCs) each connected to control multiple BTSs. A mobile switching center (MSC) is coupled between BSCs and a carrier public switched telephone network (PSTN) to handle the regular voice or data calls. Under the CDMA2000 standards, the packet data handling mechanism in a CDMA WWAN may include packet control function (PCF) modules and a packet data service node (PDSN) that are coupled between a BSC and the packet data network for transmitting the data packets. The packet data network may be configured to operate based on a proper packet data protocol, such as a carrier network based on the Internet Protocol (IP).

Different from the above CDMA WWAN or other WWANs, a wireless local area network (WLAN) is a wireless network that covers a small geographic area to provide packet data services for mobile communication devices. The WLAN can be better configured and optimized than a WWAN to provide faster and reliable data links for mobile users. Currently, the IEEE 802.11 standards have been widely adopted as one of the communication protocols for WLANs. Many high-speed WLAN services are usually provided locally in selected buildings or limited local areas called "hot spots" or "hot zones."

SUMMARY

This application includes hardware and software interfaces and associated features for unified access to both WWANs and WLANs without service interruption as a mobile user roams across such different networks. In one implementation, one or more WLANs may be integrated or interconnected with one or more WWANs through communication nodes called access point gateways (APGWs). A radio transceiver called access point (AP), which is analogous to the BTS in a CDMA WWAN to a certain extent, is connected to a APGW and provides a local radio hot spot or zone to provide high-speed packet data services for mobile communication devices. An APGW, analogous to a BSC and a PCF in a CDMA WWAN in certain functions, connects and integrates one or more connected APs to a packet data network so that an authorized AT may continue a packet data service when the AT switches between a WLAN and a WWAN to remain connected with either of the WLAN and WWAN as the AT moves from one location to another. Such an AT is configured to include a WLAN-WWAN communication card or two separate network cards for accessing WLAN and WWAN, respectively, with two different air interfaces. A suitable WWAN may operate under one of the CDMA2000 standards such as the CDMA2000 1xEV-DO and the CDMA2000 1x. The WLAN may operate under one of the IEEE 802.11 protocols.

The interfaces described here include solutions for system acquiring and releasing mechanisms, handoff between WWAN and WLAN, mobility management, and unified mechanisms for authentication, authorization, and accounting (AAA) for both WWAN and WLAN.

In one implementation, a communication system may include a CDMA network as a WWAN and a WLAN. The WWAN is coupled to an IP network to provide packet data service to mobile communication devices. The WLAN includes at least one access point (AP) that communicates with a mobile communication device located in an access area of said AP, and an access point gateway (APGW) connected between said AP and one packet data serving node in said CDMA network to allow for continuity of a packet data service to said mobile communication device by switching a packet data service connection for said mobile communication device between said WLAN and said CDMA network.

In another implementation, an access point gateway is provided between an access point in a WLAN and a packet data service node in a CDMA2000 WWAN to interconnect said WLAN and said WWAN. An access terminal that has both a WLAN interface and a WLAN interface is used to communicate with said WLAN and said WWAN. In addition, a control mechanism in said access terminal is used to determine which of said WLAN and said WWAN is to be used for a packet data service according to a signal parameter detected by said access terminal. The switching between a communication between said WLAN and said WWAN is controlled to allow for said access terminal to roam in said WLAN and said WWAN without an interruption to said packet data service.

These and other features, system configurations, control techniques, associated advantages, and implementation variations are described in detail in the following drawings, detailed description, and claims.

BRIEF DESCRIPTION OF THE DRAWINGS

FIG. 7 illustrates different control modules in the AT.

FIGS. 9A and 9B show the operation steps for intro-PDSN and inter-PDSN dormant handoff to WLAN, respectively, under the PPPoE.

DETAILED DESCRIPTION

The techniques and systems described here in general are based on hardware devices and software control in both the network system and the access terminals that are designed to allow for accessing the interconnected WWAN and WLAN. Each access terminal is designed to include either two network access cards for accessing WLAN and WWAN, respectively, or a single network card with two ports for accessing WLAN and WWAN, respectively. The access terminals may be any mobile communication devices including mobile phones, Personal Digital Assistants (PDAs), and mobile computers and may be designed to handle either both voice and data communications, or only data communications. The network access card or the access port for the WWAN may be configured based on various CDMA2000 standards. Applicable CDMA2000 standards include, but are not limited to, CDMA2000 1X, CDMA2000 1xEV-DO, and CDMA2000 1xEV-DV. In the following sections, CDMA2000 1xEV-DO is used as an example in various implementations and may be replaced by another suitable CDMA2000 or its compatiable standard. A control mechanism is implemented to switch an access terminal (AT) between the WWAN and WLAN links so that a packet data service can be maintained without interruption. The network access card or the access port for the WLAN may operate under one of the IEEE 802.11 protocols.

At the network system level, one or more access points are implemented to provide radio access hot spots or zones within the WLAN. One or more AP gateways are used to interconnect the WLAN and the WWAN, where each APGW is connected between one or more APs in the WLAN and a PDSN in the WWAN. APGWs allow for the operations and services in the WWAN and WLAN to be controlled and managed through a unified system. When properly implemented, such interconnected or interworked WWAN and WLAN systems allow the WWAN operators to provide WLAN services and a WLAN operator to have access to WWAN operated by another operator.

Figure 1:
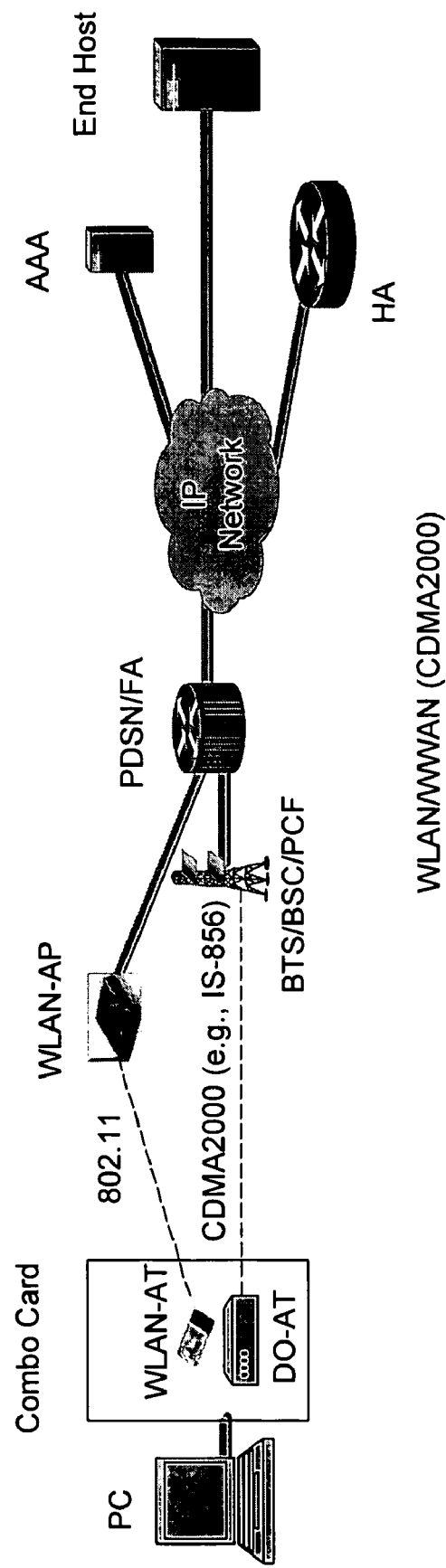
FIGS. 1 and 2 illustrate interworking of WWAN and WLAN.
Figure 2:
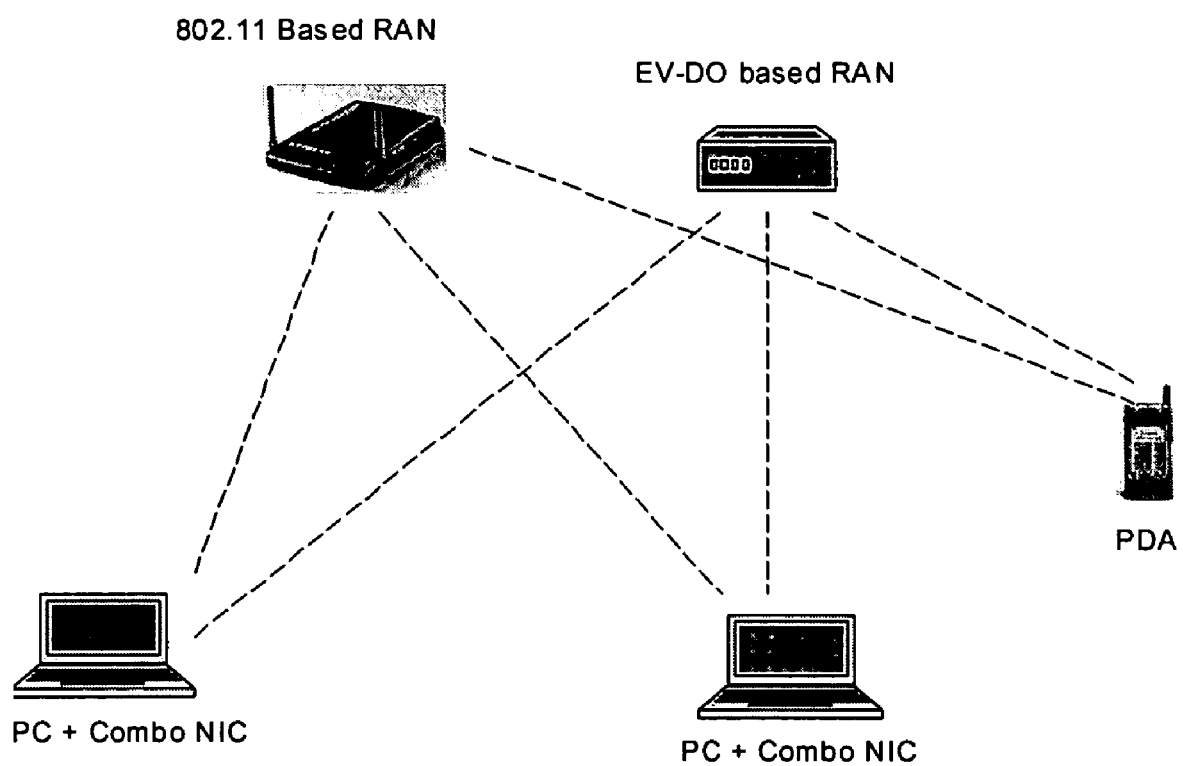

FIGS. 1, 2, 3, and 4 illustrate exemplary system architectures for interconnecting WLAN and WWAN. FIG. 1 shows a PC with a combination network interface card (NIC) with a WLAN access terminal for communications with the WLAN under IEEE 802.11 and a WWAN access terminal (DO-AT) for communications with the WWAN under IS-856 (CDMA2000 1x EV-DO). FIG. 2 shows multiple ATs with dual access capability, such as PCs and PDAs, may access the IEEE 802.11-based radio access network through one common AP, or access the EV-DO based radio access network through one common BTS.

Figure 3:
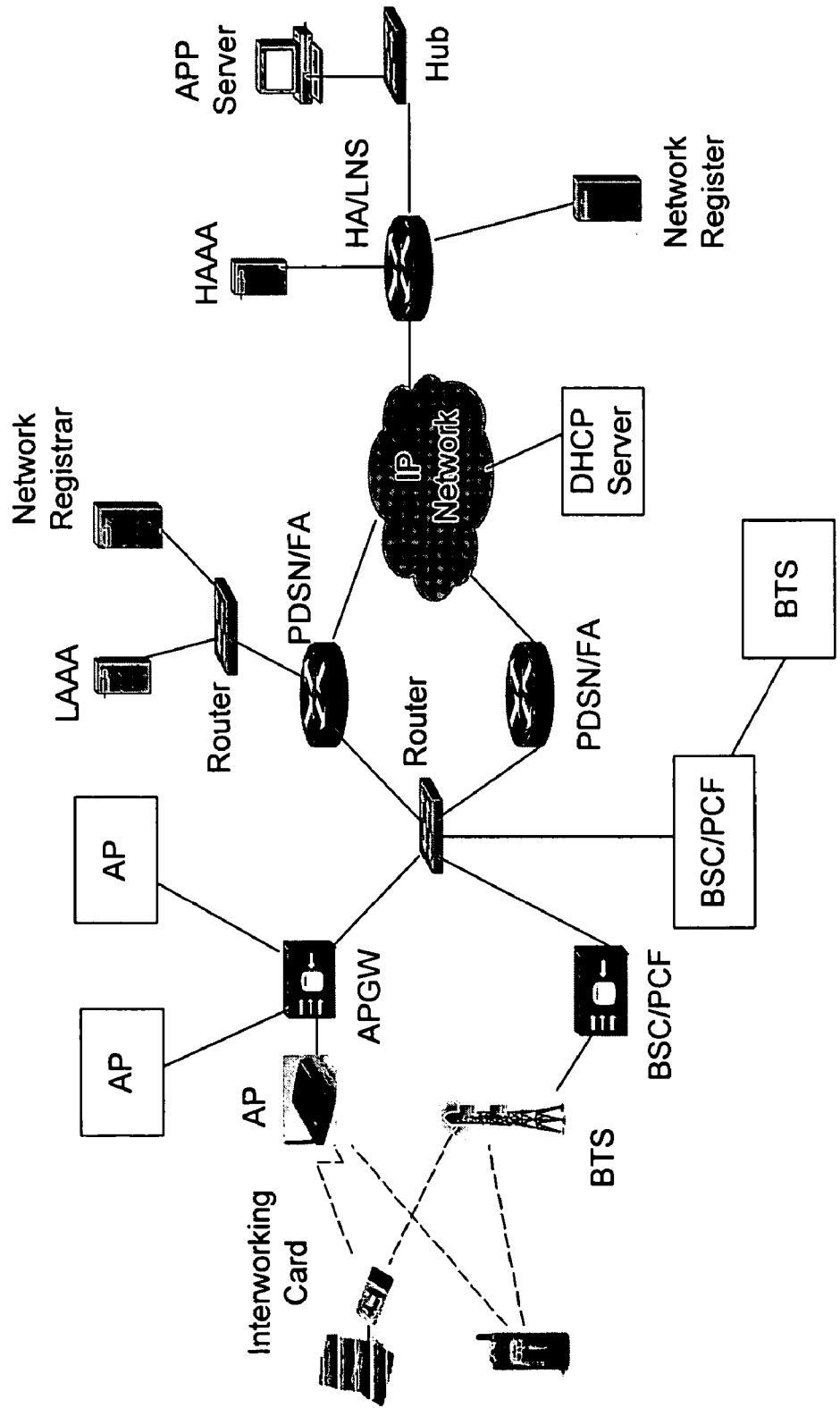
FIGS. 3 and 4 show two examples of the WWAN-WLAN system architecture.
Figure 4:
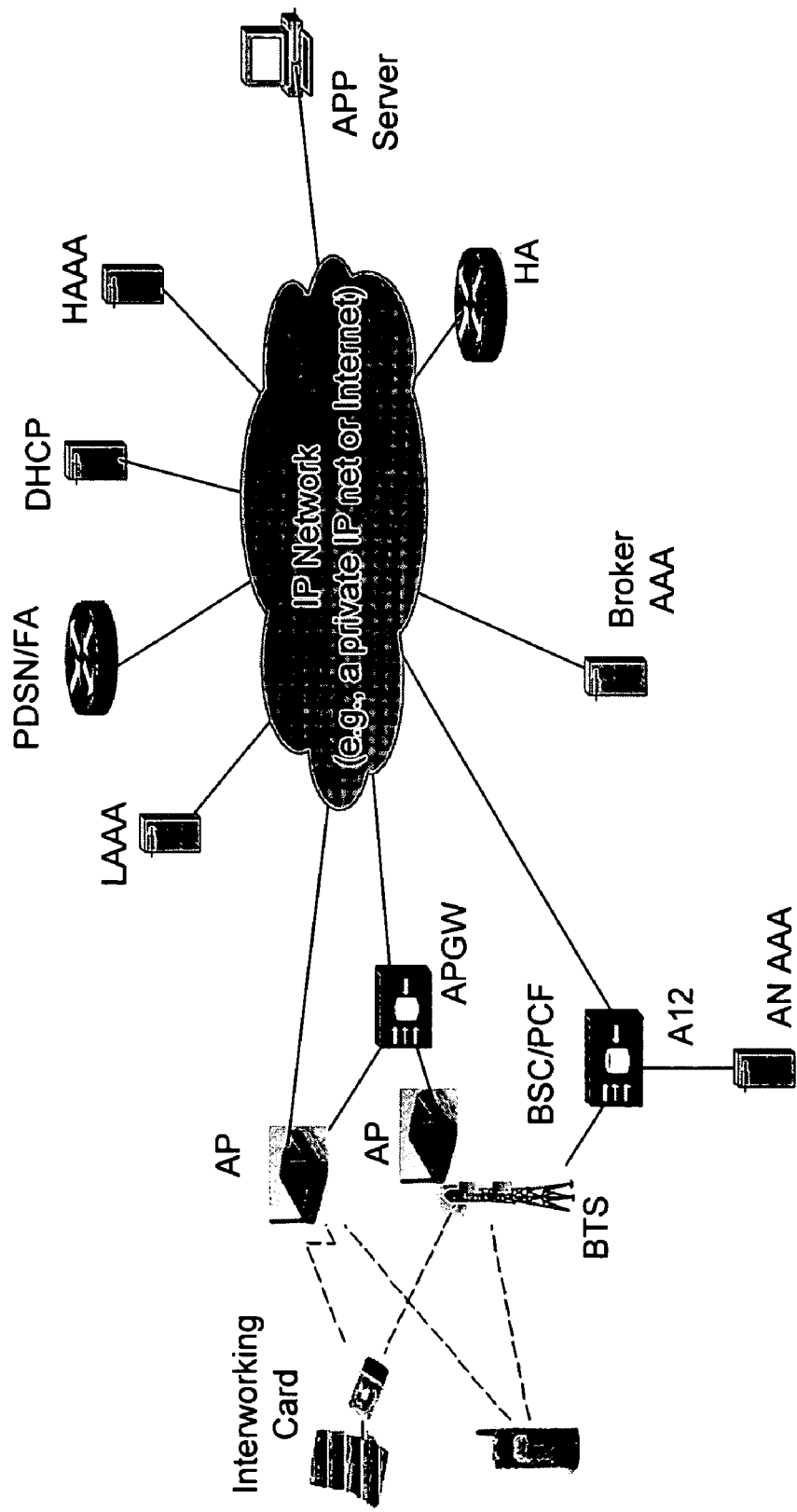

FIGS. 3 and 4 show two examples of the WWAN-WLAN system architectures. Wireless ATs may receive and send communication signals through base transceiver stations (BTSs) over electromagnetic waves in the air, e.g., WWAN radio links. Air links for the WWAN are generally different from air links for the WLAN. Hence, as discussed above, each AT may be configured to have either a WWAN network card and a WLAN network card, or a single network card with a WWAN interface and a WLAN interface. The base transceiver stations are distributed in a service area with multiple spatially divided cells to form a radio access network for the WWAN. Each cell may have one base transceiver station. Alternatively and more commonly for some CDMA systems, each base transceiver station may be designed to have directional antennas and may be placed at a location on edges of multiple cells in a sectorized arrangement to cover these cells. A network of base station controllers (BSCs) are connected, usually with wires or cables, to BTSs for controlling the BTSs. Each BSC may be connected to one or more designated BTSs.

The WWAN-WLAN system in FIG. 3 or 4 connects to two types of communication networks: one or more public switched telephone network (PSTN) and one or more packet data networks (e.g., IP network such as a private IP network or the Internet). The basic wireless system hardware for the WWAN includes at least one mobile switching center (MSC) as a control interface between the BSCs and the PSTN. The MSC essentially manages regular voice or data calls to and from the ATs of subscribed users. The Short Message Service (SMS) may also be provided through the MSC. The packet data services are provided through the IP network. This part of the WWAN system as illustrated includes packet control function (PCF) devices and packet data serving nodes (PDSNs) that are coupled to the basic CDMA network. Each PCF can be connected between the BSC and the PDSN in general and may be integrated with the BSC as a single device. The PDSN may be generally configured to provide packet data communications over the radio access network and through the packet data network, and to execute functions for authentication, authorization, and accounting (AAA) through one or more connected AAA servers such as a home AAA (HAAA) and a local AAA (HAAA). The basic functions of these WWAN components are specified by CDMA2000 standards.

The WLAN includes at least one and generally multiple APs to form the WLAN radio access network in selected hot spots or zones. Each AP communicates with one or more ATs that are located in its access area via WLAN radio links. Notably, an access point gateway (APGW) is connected between one or more APs and one of the PDSNs in packet data network connected to the WWAN to allow for continuity of a packet data service to an AT by switching a packet data service connection for the AT between the WLAN and WWAN. A network router may be used to connect different devices or modules such as AAAs, APGWs and BSCs to a PDSN as shown in FIG. 3. Alternatively, the routers may be eliminated by connections through the IP network as shown in FIG. 4. The switching may be accomplished automatically accoding to pre-set operating conditions in the control mechanism as the AT moves from one location to another. For example, if the AT is initially connected to an AP but is moving out of the hot spot for that AP, the connection may then switch to the WWAN to continue the packet data service to the AT when the initial AP becomes unavailable. When another AP is available, the AT may be switched to the new AP for faster data link. Hence, the switching may be used to roam from one AP to another AP within the WWAN without losing the packet data service.

FIGS. 3 and 4 further show home agents (HAs) and foreign agents (FAs) in handling IP addresses for the ATs. A foreign agent is generally a router serving as a mobility agent for a mobile AT and works in conjunction with the home agent to support Internet traffic forwarding for a device connecting to the Internet from any location other than its home network. These features, AAA features and others are described in greater detail in later sections of this application. A HA or FA may be integrated as part of a PDSN in various implementations.

Different from other ATs in WWANs, each AT in the WWAN-WLAN interworked system is designed to maintain two individual air interfaces to WWAN (e.g., EV-DO) and WLAN (e.g., IEEE 802.11) and provides protocol stacks for the EV-DO and WLAN networks. Both Simple IP and Mobile IP based services are supported in each AT. A switching control mechanism may be implemented in ATs to control the interworking handoff between WWAN and WLAN, e.g., based on signal strengths, user data rates, a suitable error rate, and other parameters. Each AT may also support either PPPoE or DHCP protocols to act as a PPPoE client to communicate with a PPPoE server, or a DHCP client to communicate with a DHCP server, respectively. For example, ATs may be MT0-type or the TE2/MT2 type of mobile devices with an additional WLAN-CDMA interworking card. ATs without the WWAN-WLAN interface card may also operate in systems shown in FIGS. 3 and 4 to obtain services from either the WLAN or the WWAN, but not from both.

The APGWs may be configured to provide a layer 2 control function similar to the PCF. More specifically, an A11-like interface, such as the A11 interface and another suitable interface similar to the A11, is used in APGWs to inform PDSN to establish a data link to APGW and an A10-like interface is used to provide tunneling function between APGW and PDSN. The interface from an APGW to APs may use a standard interface supported by IEEE 802 specifications, ATM based interfaces, or other suitable interfaces. Both PPPoE and DHCP may be supported so that an APGW may act as the Access Concentrator (server) of PPPoE or a Relay Agent to the DHCP server. The APGWs can also provide PPPoHDLC framing on the PPP packets to PDSN.

The PDSN in FIGS. 3 and 4 is an access gateway to the Internet, intranets and applications servers for ATs. The PDSN may also operate as a foreign agent to support Mobile IP, or a client for AAA servers, or a tunnel to DHCP servers. The A10/A11 interface is used to connect the PDSN to a PCF in the WWAN and A10/A11-like interface is used for connecting to an APGW in the WLAN. The PDSN also maintains a single protocol stack for an AT in both networks and records and sends the billing information to AAA servers.

Figure 5:
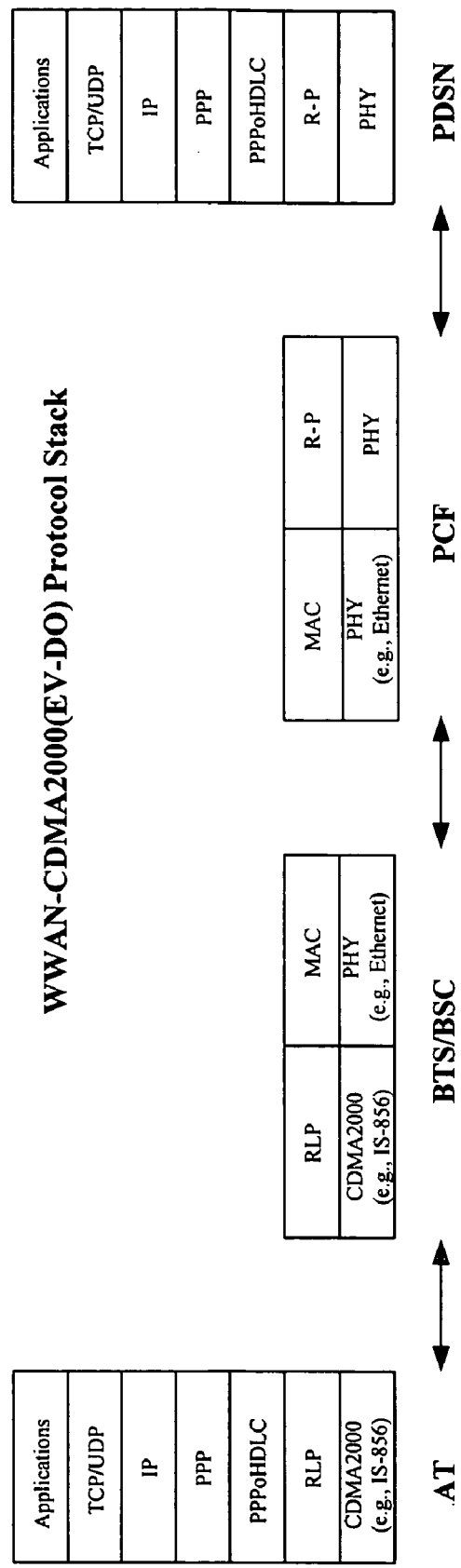
FIG. 5 illustrates WWAN protocol stacks for different network components for the WWAN-WLAN system in FIG. 4 where the WWAN is assumed to be a CDMA2000 1xEV-DO system.
Figure 6A:
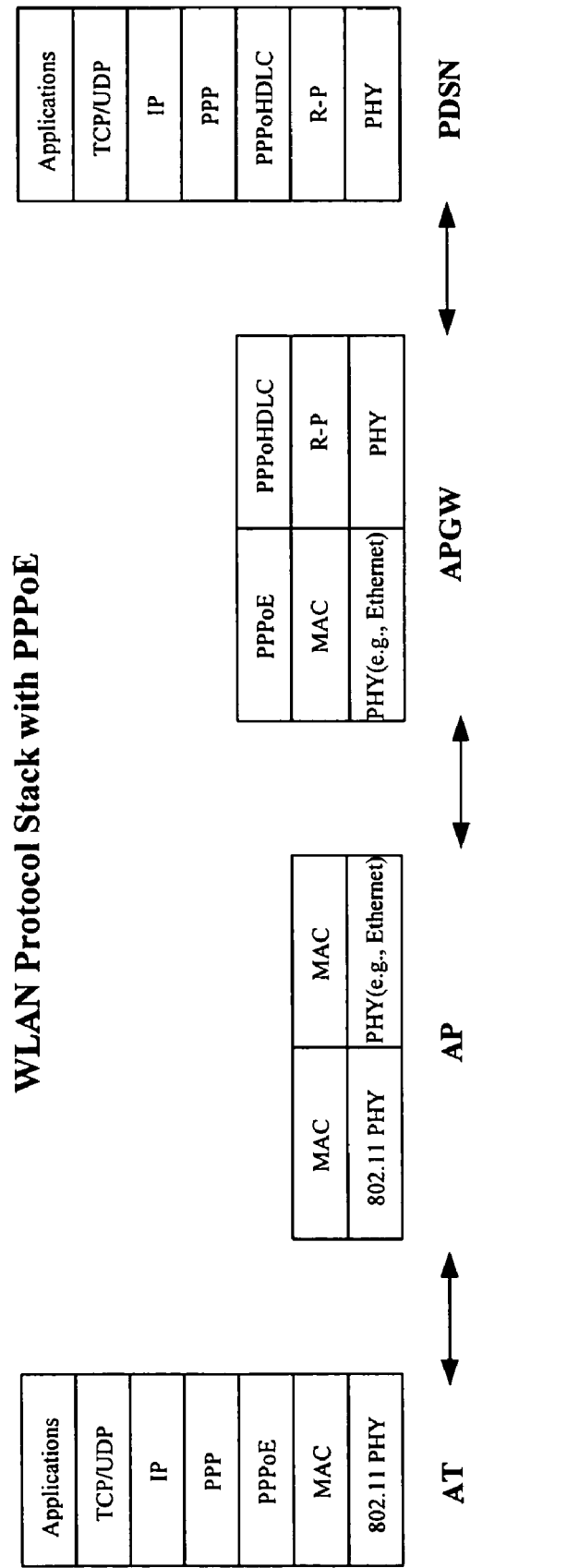
FIGS. 6A and 6B show corresponding protocol stacks for the IEEE 802.11 based WLAN for the PPPoE and DHCP, respectively, in the system in FIG. 4.
Figure 6B:
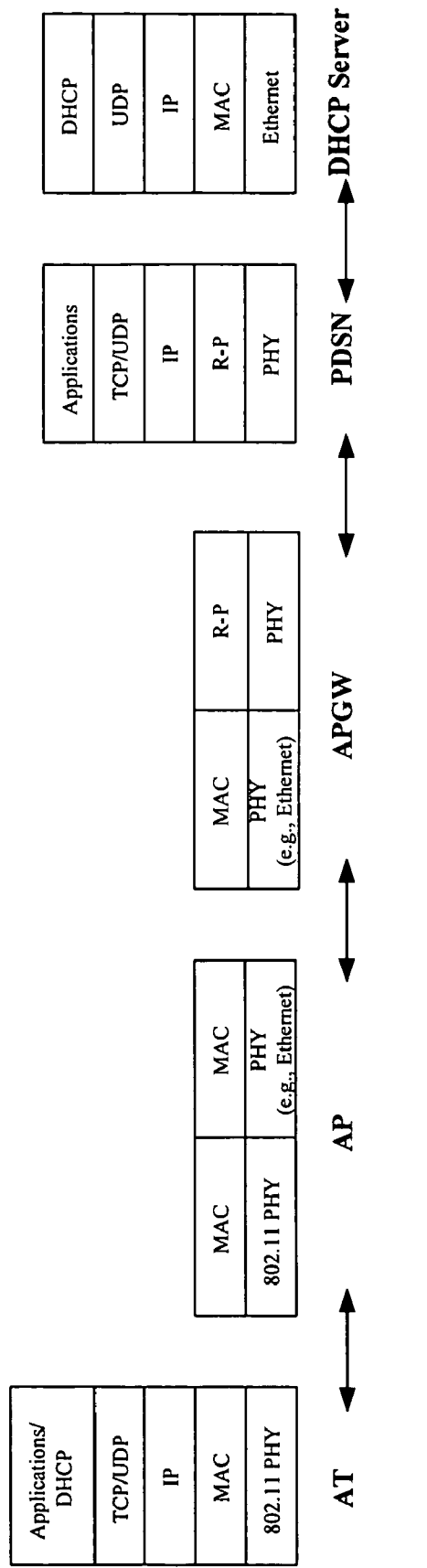

FIG. 5 illustrates WWAN protocol stacks for different network components for the WWAN-WLAN interworked system in FIG. 4 where the WWAN is assumed to be a CDMA2000 1xEV-DO system. FIGS. 6A and 6B are the corresponding protocol stacks for the IEEE 802.11 based WLAN for the PPPoE and DHCP, respectively. As an example, the protocols for AT in the WWAN (EV-DO) are Services in the Application Layer, TCP/UDP in the Transport Layer, IP in the Network Layer, PPP/PPPoHDLC in the Data Link Layer, and IS-856 in the Physical Layer. For the WLAN under 802.11, the protocol stacks for AT are Services or DHCP client in the Application Layer, TCP/UDP in the Transport Layer, IP in the Network Layer, PPP/PPPoE client in the Data Link Layer and IEEE 802.11 based Physical Layer.

As another example, APGW uses A10/A11-like interface where A11-like provides the R-P link control, and the A10-like interface uses GRE to provide tunneling to PDSN. As a further example, the physical layer for the APGW is T1, fiber or other suitable transmission media; and in PCF, the A11 is used for providing the radio packet (R-P) link control, A10 uses GRE to provide tunneling to PDSN, and A/8/A9 interface is used to connect to the access network (AN) formed by the BTSs and BSCs.

The AAA mechanism in the systems in FIGS. 3 and 4 provides several functions. The AAA in the service provider network, i.e., a local AAA, provides IP addresses for mobiles using Simple IP and the route between PDSN and home AAA (HAAA) for mobiles' authentication and authorization, and provides a root for the user profile received from the home AAA to the PDSN. The AAA in the home IP network performs the mobiles' authentication and authorization requested from local AAA, and provides the user profile to PDSN via the local AAA. The AAA also keeps billing record received from the PDSN for the network use by the AT user.

Figure 7:
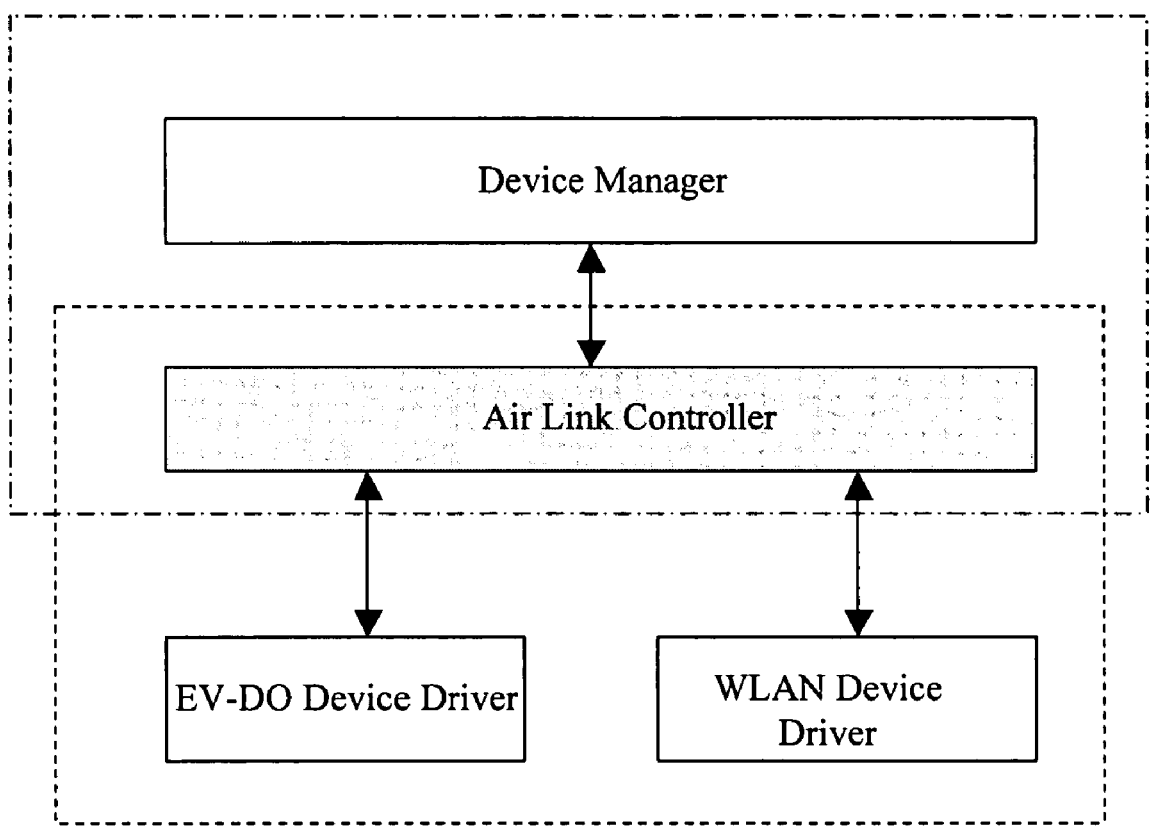

In one implementation, each AT is programmed with control modules to control the system acquiring and releasing in the WWAN-WLAN system. FIG. 7 illustrates different control modules in the AT. In operation, the AT determines whether to enter WWAN EV-DO system or WLAN based on the Air Link Status maintained in an air link driver installed in the AT. The Air Link Status may include the following three different states, Acquiring, Acquired, and Lost. In the Acquiring status, the NIC in the AT has found an RF signal of the CDMA2000 WWAN or WLAN network, and is establishing the connection with the selected network. In the Acquired status, the NIC is connected to the selected network. In the Lost status, the NIC does not find the RF signal of CDMA2000 WWAN or the WLAN network.

Both CDMA2000 WWAN (e.g., EV-DO) and WLAN air link device drivers may work independently to monitor the air link conditions. In one exemplary implementation, when the monitored RF signal strength exceeds a given threshold, the device driver declares that it is acquiring the network, and it sends a signal to the air link controller about the existence of the network. When the monitored RF signal strength is below a given threshold, the device driver declares a loss of the connection to the network, and it sends a signal to the air link controller about the absence of the network. The air link driver should have the ability to enable and disable the air link device. The device driver may have the ability to enable or disable the air link transmitter only in some implementations.

The air interface controller should control the CDMA 2000 (e.g., EV-DO) and WLAN devices to enter and leave networks based on the air link conditions. The air link interface controller may be implemented as a part of device manager of a suitable operating system such as the MS Windows, or a super device driver of the air interface drivers.

The conditions for connecting the AT to the WWAN and WLAN may be preset to the preferred network such as the WLAN. For example, the conditions to enter WLAN may include the following. Once the WLAN device driver reports acquiring WLAN, the air interface controller permits the device to enter WLAN network and notifies the upper layer software to establish a connection to the AT. If the AT is connected to CDMA2000 WWAN (e.g., EV-DO), the air interface controller performs the handoff procedure to handoff the service to the AT from the WWAN to WLAN.

The conditions to leave WLAN may be set as following. For example, when the AT is connected to WLAN in the lowest supported data rate and an error rate for monitoring, such as the frame error rate (FER) or the bit error rate (BER), is higher than the given threshold, the WLAN device driver notifies the air interface controller. The air interface controller controls the AT to leave WLAN and handoff to CDMA2000 EV-DO network if the EV-DO NIC device reports acquiring CDMA2000 EV-DO network. The air interface controller may force the AT to continue its connection to WLAN if the EV-DO device driver does not report acquiring CDMA2000 EV-DO until AT loses the connection to WLAN.

The conditions to enter the CDMA2000 WWAN (e.g, EV-DO) may be set as following. The air interface controller permits the EV-DO device to enter WWAN network if CDMA2000 EV-DO device driver reports acquiring network status and WLAN device driver reports the lost network status. Once CDMA2000 EV-DO device is allowed to enter its network, AT creates a session such as the HRPD session in EV-DO on the AN and establish a new PPP or bind with existing PPP connection with PDSN.

Two conditions may be set to cause the AT leave CDMA2000 EV-DO network. First, the CDMA2000 EV-DO device reports a lost network status. When this occurs, the AT may drop the connection. Second, the WLAN device reports the acquiring network status. When this occurs, the AT is controlled to hand off to WLAN.

The handoff process in the WWAN-WLAN interworked system may use the "hard" handoff to switch air links between the WWAN and WLAN. This handoff may be designed to be seamless with proper handoff mechanism. Since the CDMA2000 (e.g., IS-856 for the EV-DO) and 802.11 are two independent interfaces on the air links, the handoff between IS-856 and 802.11 may cause a discontinuity on the air link and thus lead to discontinuity on the data-link layer. However, the handoff can keep the connectivity above the data-link layers byf maintaining the same IP stack in AT and PDSN with switching between the WLAN and WWAN systems.

If it is assumed that the WLAN offers higher data rate at lower cost than the WWAN, then the system may be set to maintain an access to the WLAN whenever possible. Under this assumption, the following sections describe one exemplary handoff strategy. Conversely, the opposite strategy or other handoff strategies may be used based on the specific requirements of the applications.

Hence, when the air link interface reports acquiring both CDMA2000 WWAN and WLAN networks, the AT will make a connection to the WLAN network and remain in the WLAN network until the air link interface reports a loss of the connection to the WLAN. The AT is used to initiate the handoff from one network to another. Such handoff may be implemented either by using the PPPoE or the DHCP.

In the PPPoE implementation, the handoff may occur in the following manner: a dormant session handoff to WLAN, an active session handoff to WLAN, a dormant session handoff to the WWAN (e.g., EV-DO), and an active session handoff to the WWAN (e.g., EV-DO). The dormant handoff and active hand off to the WWAN (e.g., EV-DO) may use the existing WWAN (e.g., EV-DO) handoff procedures and hence are omitted in this application.

The dormant session handoff to WLAN under PPPoE may be configured as follows. First, the AT is triggered to initiate the dormant session handoff to WLAN by the condition for entering the WLAN. The APGW may be triggered to establish an A10/A11-like connection to PDSN when PPPoE Access Concentrator in APGW receives PADR message from AT. Next, the APGW sends PADS with SessionID (Key) back to AT. With the SessionID (Key) in PADS, AT then binds the PPP session to APGW A10 tunneling and transmits the user application data. The PPP session terminates between the AT and the PDSN.

The R-P-like links can be established between the APGW and PDSN as follows. The APGW initiates the R-P-like link establishment to PDSN when receiving PADR message. The APGW sends an A11 Registration Request to PDSN. Next, the PDSN sends an A11 Registration Reply to APGW.

The R-P link between the PCF and PDSN may be terminated according the CDMA2000 specifcations. The PDSN initiates the R-P link termination on PCF-PDSN when PDSN has established the R-P-like link to APGW.

In one implementation, the PPP session including authentication should be established only on the first time to connect to the PDSN. For intra-PDSN handoff, re-establishment of PPP layer should be avoided in order to reduce data link breaking time. To prevent establishing a new PPP session during the interworking handoff, the APGW should use the same user information as is used during the setup of the A10/A11 interface for the PCF. Prior to a new PPP session, the PDSN checks its own PPP session list for the existence of the session with the AT and the session lists of all the PDSNs within its cluster to determine the best PDSN to handle the new session request and response. In the PADR message to APGW, AT should use the Vendor-Specific Tag to include the users specific information which may include the encrypted mobile IMSI number and other information related to A11 Registration Request to maintain the interworking handoff connectivity.

Figure 8A:
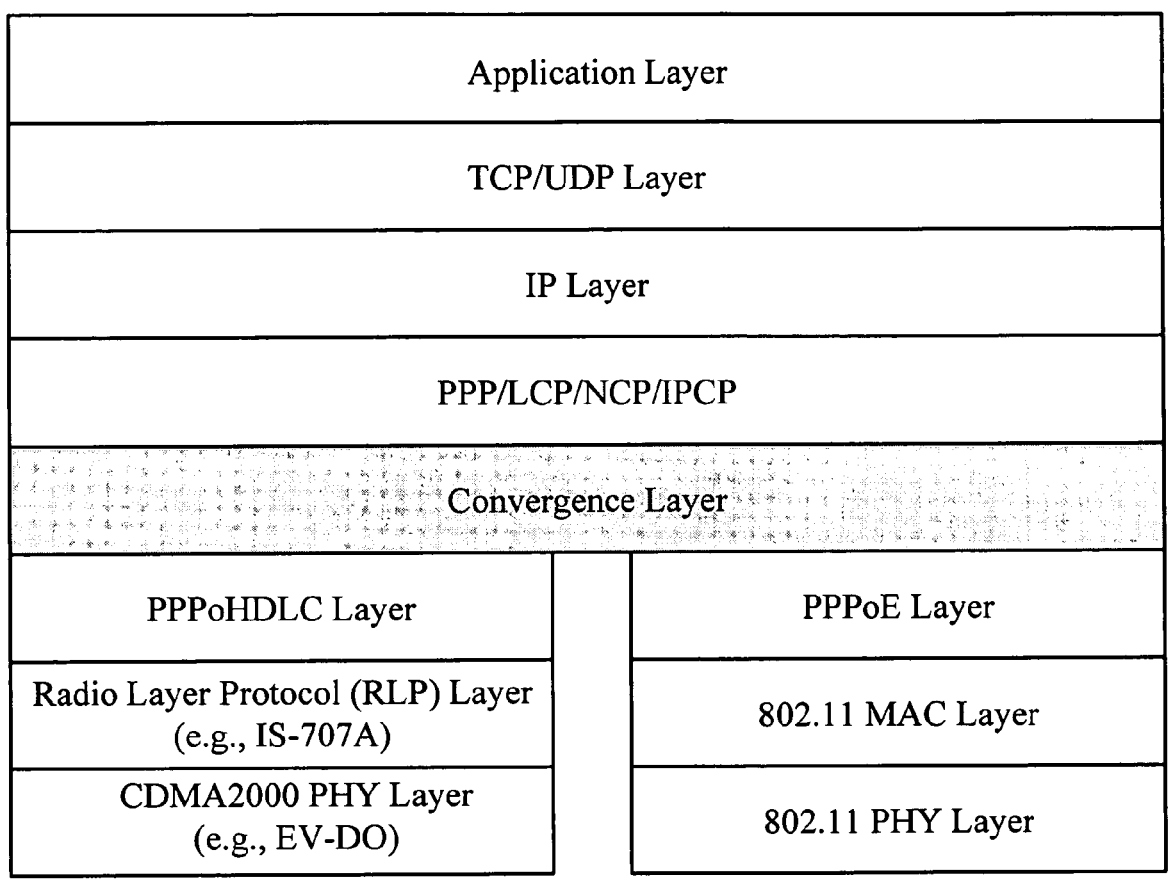
FIGS. 8A and 8B show the protocol stacks for AT and PDSN for the seamless dormant handoff to WLAN under the PPPoE.
Figure 8B:
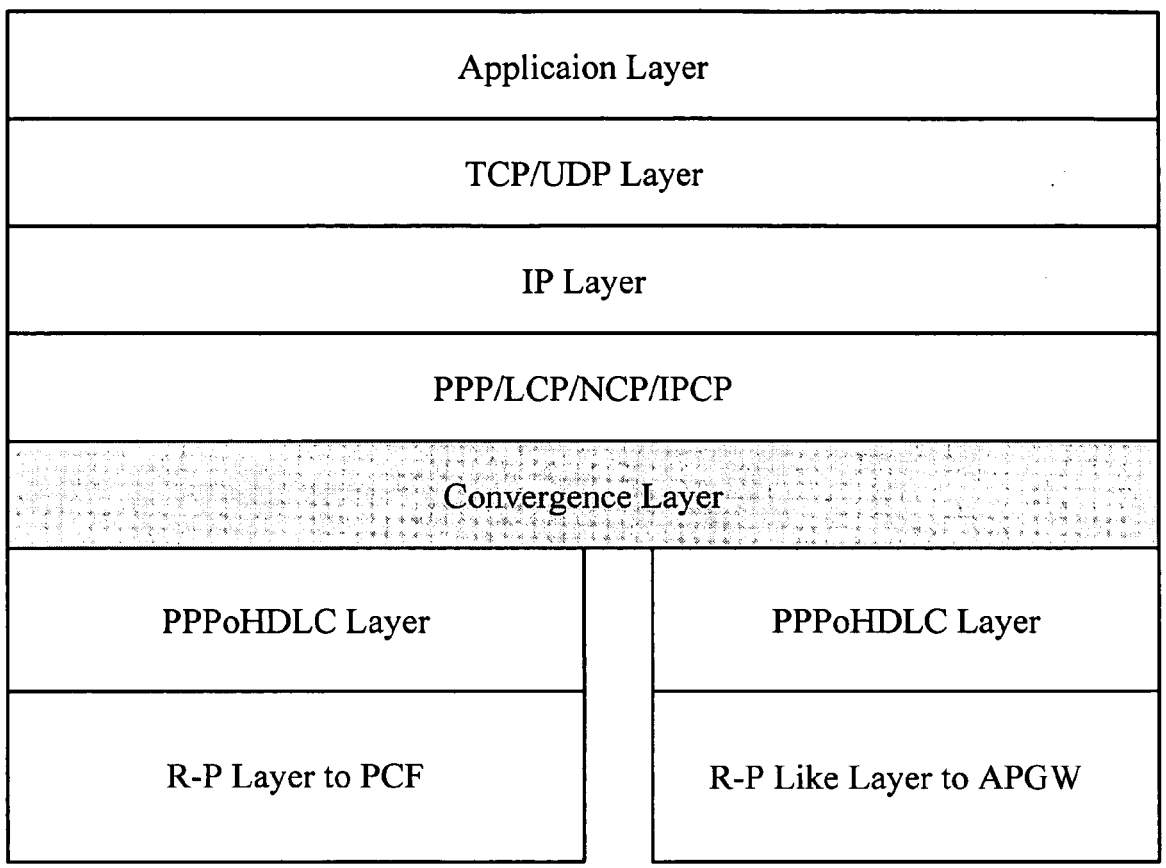

FIGS. 8A and 8B show the protocol stacks for AT and PDSN for performing handoff from the WWAN to WLAN under the PPPoE. A convergence layer is implemented in both the AT and PDSN as an intermediate layer between the PPP layer and PPPoHDLC layer. This convergence layer provides a switching function between data link layers during the interworking handoff. One function of the convergence layer is to hide the change of lower layers from PPP layer during handoff. This layer may be a virtual and transparent layer in some implementations.

Figure 9C:
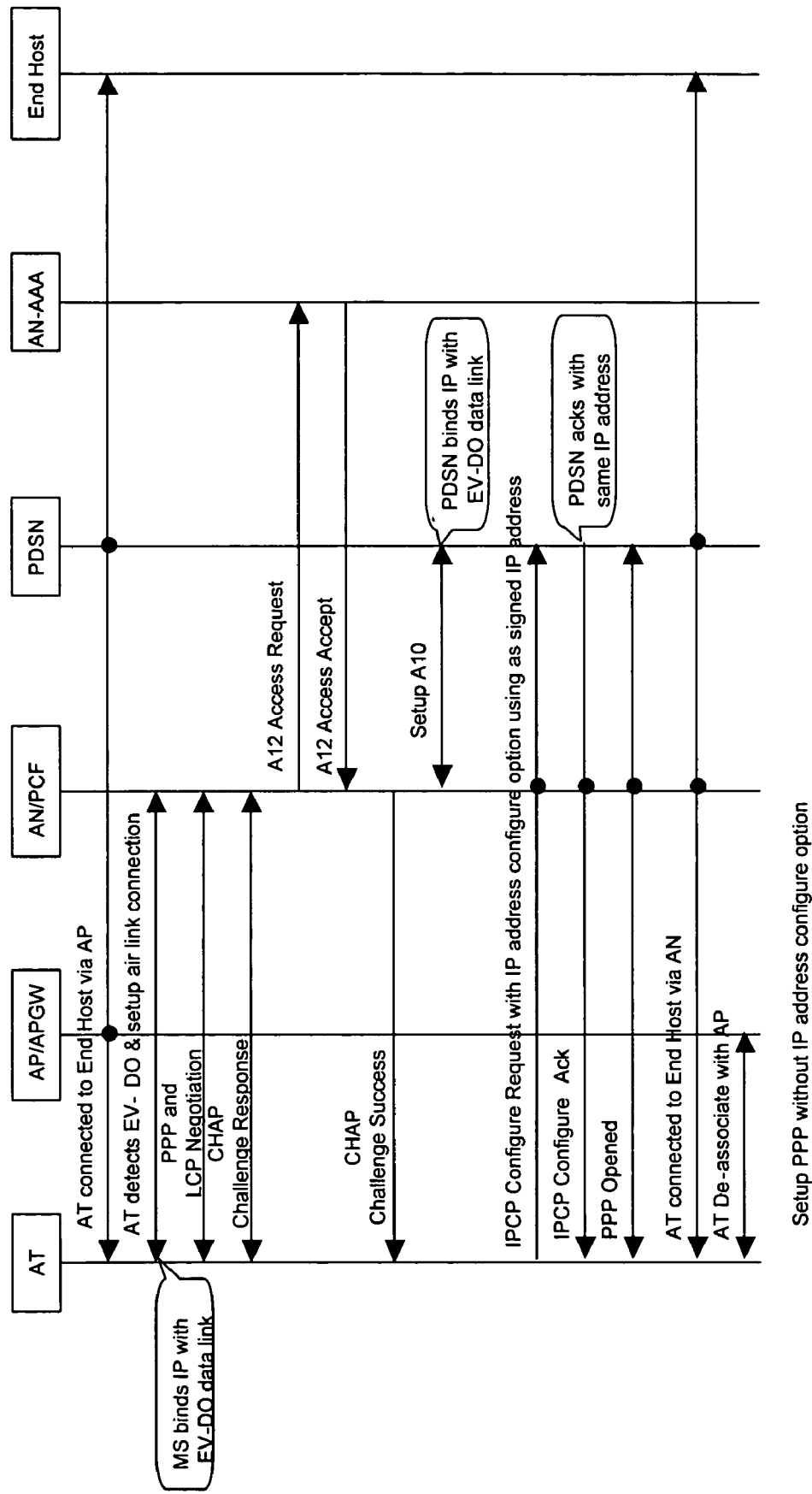
FIGS. 9C and 9D further show the operation steps for handoff from the WLAN to the WWAN under the Simple IP and the Mobile IP, respectively, where the EV-DO is used as an example for the WWAN.
Figure 9D:
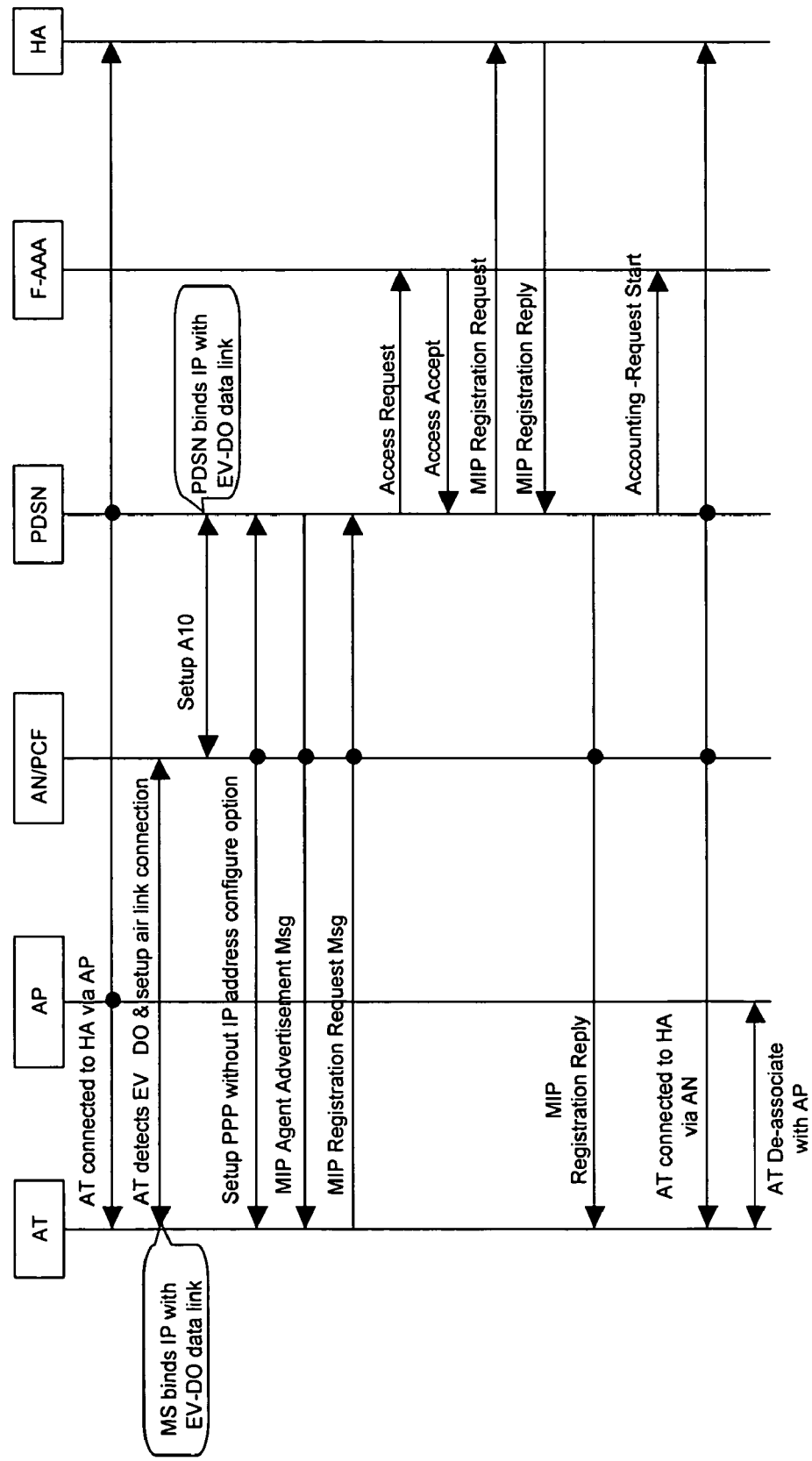

FIGS. 9A and 9B show the operation steps for intra-PDSN and inter-PDSN dormant handoff to WLAN, respectively, under the PPPoE. The A11 registration messages between AN/PCF and PDSN may be generally implemented by teardown A10 connection with AN/PCF. FIGS. 9C and 9D further show the operation steps for handoff from the WLAN to the WWAN under the Simple IP and the Mobile IP, respectively, where the EV-DO is used as an example for the WWAN.

In the active handoff to WLAN under the PPPoE, the operations for triggering the AT to initiate the active handoff and the APGW to establish A10/A11-like interface are similar to those for the dormant handoff to WLAN. The active handoff to WLAN may be implemented with the following three steps. First, the active state is changed to the dormant state. Second, the dormant handoff to WLAN is performed. Third, the dormant state is changed to the active state. Notably, this active handoff via dormant state can prevent loss of data buffered in BTS/BSC during the data link switching.

Turning to the handoff to WLAN under the DHCP, DHCP provides a protocol for delivering host-specific configuration parameters from a DHCP server to a host in Internet and uses a mechanism to allocate a network addresses to the host. The DHCP client is a module inside the AT and the DHCP server is connected in the network behind the PDSN in the WWAN-WLAN interworked system. The IP address allocation may be implemented by automatic allocation which provides permanent assignment of IP address, dynamic allocation which assigns a temporary IP address for a limited period, and manual allocation by a network administrator. The DHCP Messages used in the handoff include the following: DHCP-Discover, DHCP-Offer, DHCP-Request, DHCP-Ack, DHCP-Nack, DHCP-Decline, and DHCP-Release. Similar to the handoff for PPPoE, four different handoffs under the DHCP are dormant session handoff to WLAN, active session handoff to WLAN, dormant session handoff to WWAN (e.g., EV-DO), and active session handoff to WWAN (e.g., EV-DO).

Figure 10:
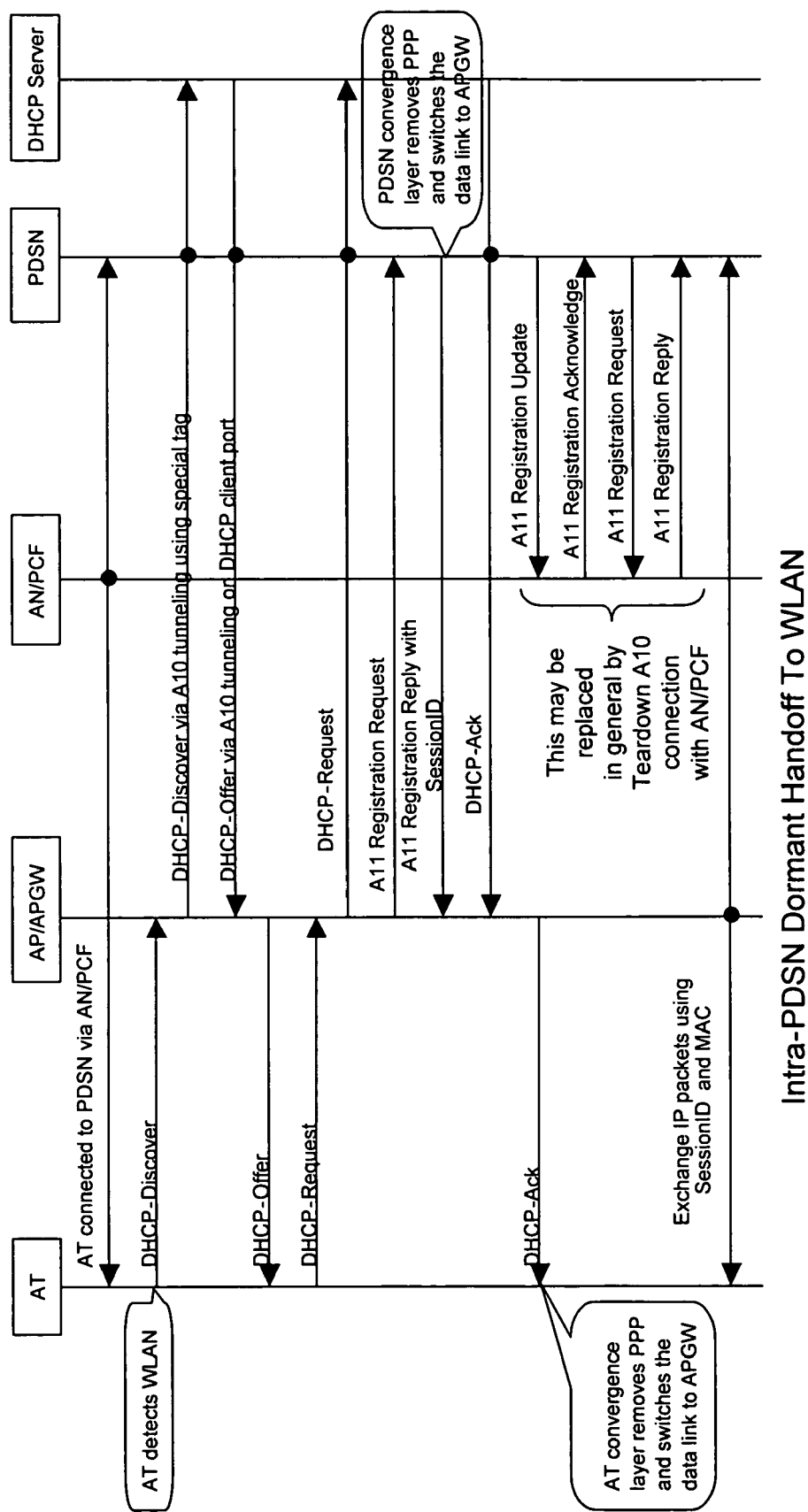
FIG. 10 illustrates operation steps in an intro-PDSN dormant handoff to WLAN under the DCHP.

In the dormant handoff to WLAN under DHCP, the triggering of AT to initiate dormant handoff to WLAN is the same as the case in PPPoE. Next, APGW is used as a DHCP Relay Agent to carry out the following operations. The DHCP Relay Agent checks DHCP port 67 to identify DHCP messages for the DHCP server. FIG. 10 illustrates operation steps in an intra-PDSN dormant handoff from the WWAN to the WLAN under the DCHP.

The following sections describe implementations of mobility management in the WWAN-WLAN systems. As mentioned above, both Simple IP and Mobile IP are supported. In the Simple IP, the IP address of AT is assigned dynamically by the local AAA of the serving network the first time that AT connects to PDSN and AT keeps its assigned IP address until the session closes. Within the same PDSN serving area, it is not necessary for AT to change its IP address when AT changes its serving radio access networks. Once an AT moves out the current PDSN serving area, it requests for a new IP address.

In the Mobile IP, the IP address of AT is assigned by the home AAA of its home network. The AT always keeps this IP address regardless whether it handoffs to a new serving area. The mobile node can roam out of its home IP network using the fixed IP address. The PDSN essentially acts as an access gateway to IP network for both EV-DO and WLAN.

In the Simple IP, the IP address is assigned to the AT by using the IPCP to get an IP address from the serving PDSN if the AT supports PPP. If the AT supports DHCP, the DHCP can be used to get an IP address from the DHCP server on serving PDSN under the Simple IP. In the Mobile IP, the MIP Registration Request/Reply is used to inform PDSN and the AT of the assigned home address.

Figure 11:
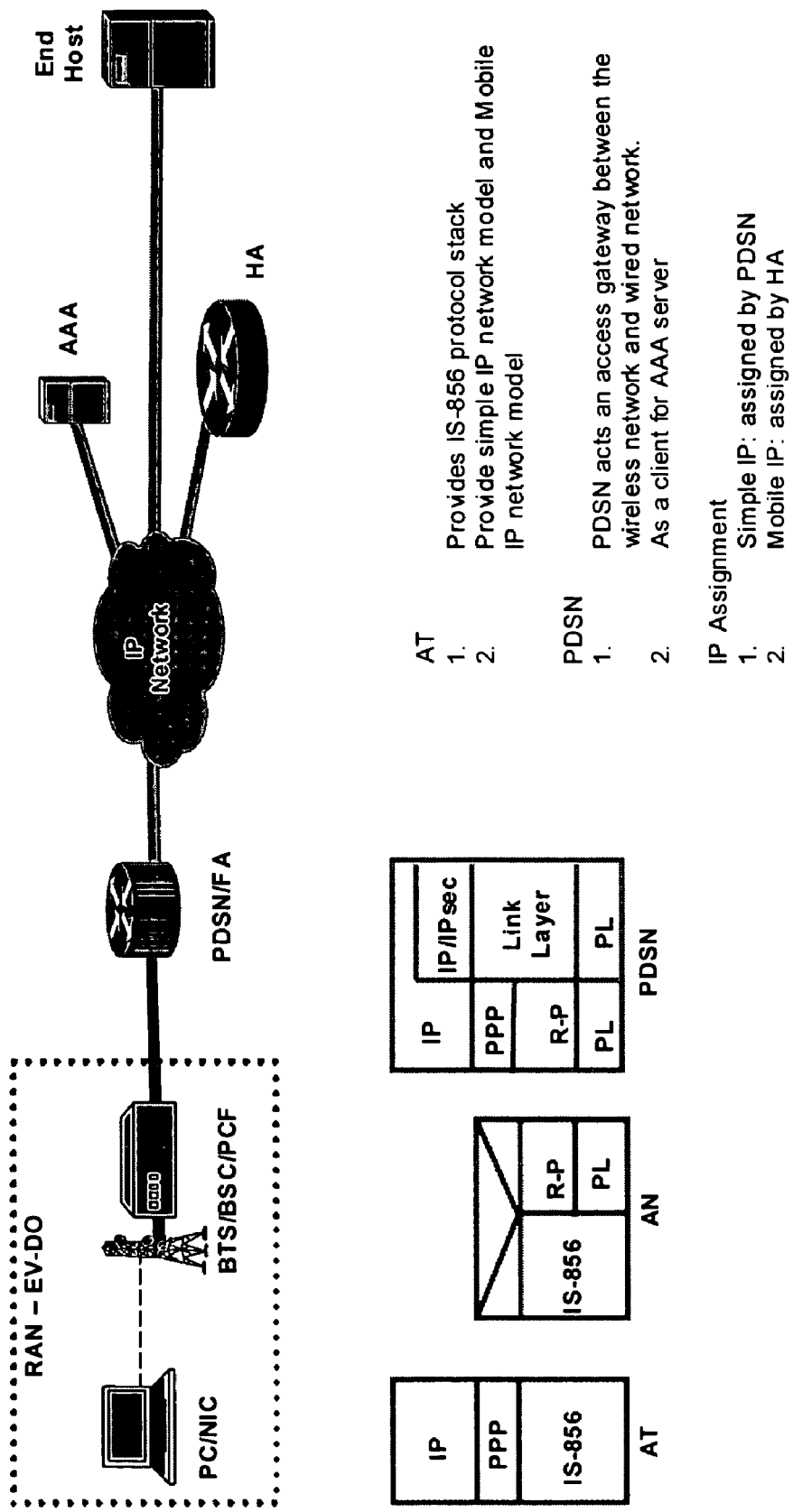
FIGS. 11 and 12 illustrate, under one implementation, the system hardware components and the corresponding protocol stacks in both the WWAN (EV-DO) and the WLAN for mobility management, respectively.
Figure 12:
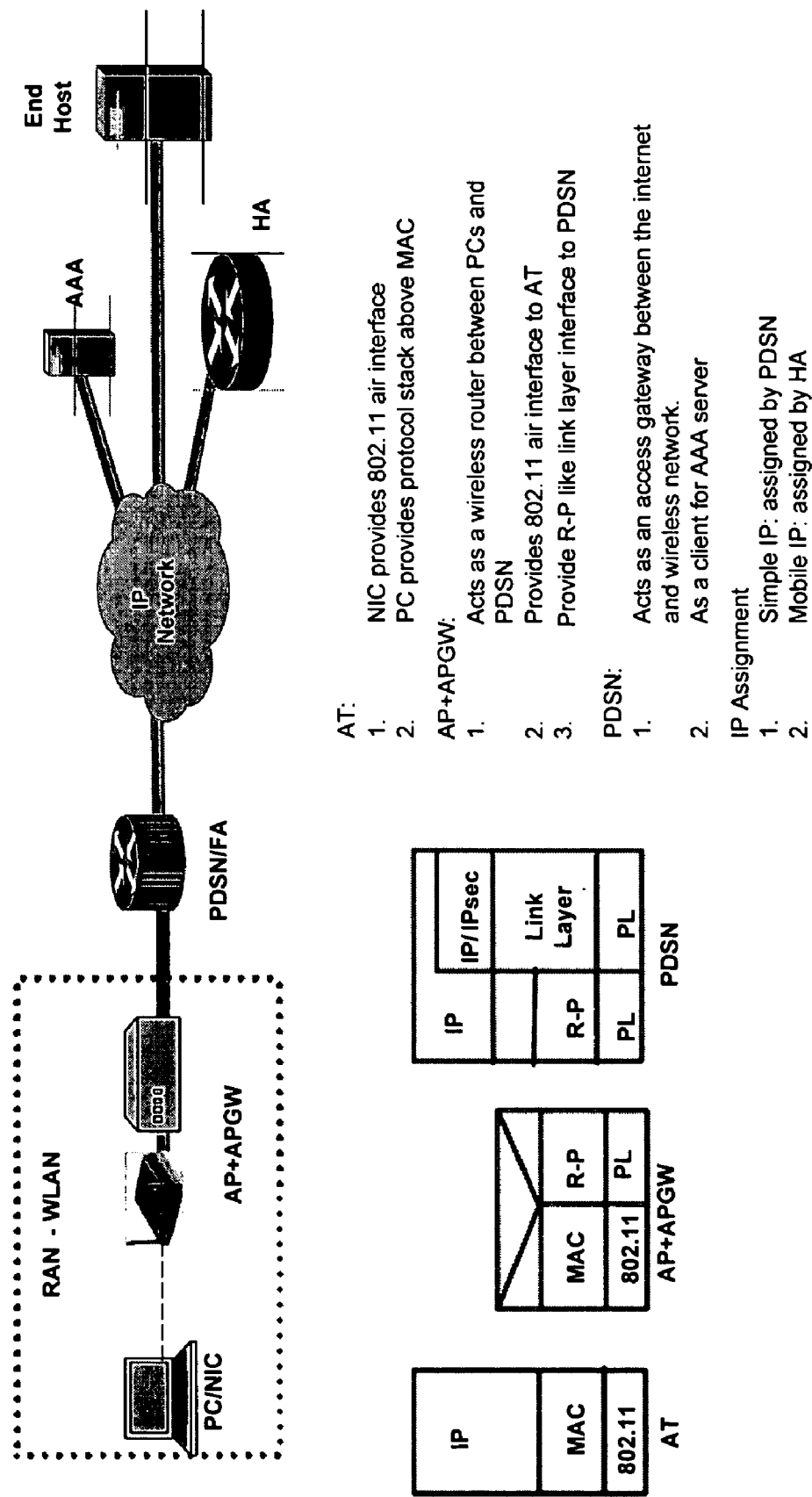

FIGS. 11 and 12 illustrate, under one implementation, the system hardware components and the corresponding protocol stacks in both the WWAN (EV-DO) and the WLAN for mobility management, respectively. The mobile node can roam out of its home IP network using a fixed IP address for a mobile node. The HA and AAA in the mobile home IP network are accessible for the WWAN (e.g., EV-DO) and WLAN service provider. The PDSN acts as an access gateway to IP network for both the WWAN and WLAN. This mobility management has simple architecture for both networks and reuses the network components in the CDMA2000 network, such as AAA and HA. In particular, the system is able to provide seamless connectivity on the above data-link layers.

The AAA for the WWAN-WLAN interworked systems described here provides a unified and integrated approach to various AAA functions. The system architecture in FIG. 4 may be used for implementing the unified AAA. For the CDMA2000 system, the radio access network authenticates the mobile during CDMA2000 system access. An AP may be directly linked to the LAAA via either a router or the IP network. When the mobile user registers for packet data services, the RADIUS protocol may be used for providing packet data AAA services. The AAA-client function at the PDSN and the AAA server located in the home network provides RADIUS capabilities conforming to RFC 2865, 2866 and 2868. Enhanced AAA capabilities conforming to 3GPP2 P.S0001 are also supported. Proxy/Local and broker-AAA servers also conform to the above stated specifications.

For the WLAN access, the IEEE 802.1x framework may be used for authentication during WLAN access. The Access Point provides Authenticator functions conforming to IEEE 802.1x specifications. The AAA server located in the home network provides RADIUS based Authentication Server functions. The Proxy/Local and broker-AAA servers forward RADIUS messages between the Authenticator and the Authentication Server. Similar to the cdma2000 type of access, RADIUS protocol between the AAA-client at the PDSN and the AAA server in the home network, are used for authentication, authorization and accounting for packet data services.

In one implementation, the WWAN-WLAN system supports authentication services at four functional levels: during wireless link access, during PPP link establishment, during MoIP based service access, and during initiation of an application instance.

Authentication during, wireless link access includes authentication based on home location register (HLR) for the CDMA type of system access and IEEE 802.1x based authentication for WLAN type of system access. The IEEE 802.1x authentication is based on Extensible Authentication Protocol (EAP) as specified in RFC 2284 which specifies support for multiple authentication algorithms. The IEEE 802.1x specification defines encapsulation format used for transmission of EAP messages over WLAN air interface. This encapsulation format, known as EAPOL used for communication between the AT and the authenticator. The Access Point provides authenticator functions per the IEEE 802.1x specification. The authenticator (AP) re-packages EAP frames in RADIUS format for onward transmission to the Authentication Server/home-AAA, via the proxy/local broker-AAA entities, and vice versa. The AT uses PPP Vendor-Specific Option (RFC 2153) to pass implementation specific information (e.g. IMSI) to the Authentication Server.

Authentication during PPP link establishment uses PPP services, as specified in 3GPP2 P.S0001 specifications supported at the AT/mobile and the PDSN for both the cdma and WLAN type of system access. The PPPoE framework is supported at the AT and the AP Gateway for WLAN access. The AP Gateway provides RFC 2516 compliant Access Concentrator functions. The Vendor Specific Tag, as specified in RFC 2516, is used for transfer of implementation specific information (e.g. IMSI) between the AT and the Access Concentrator. The AT and the AP Gateway negotiate a Session_ID during PPPoE Discovery stage. The AP Gateway establishes A10 connection with the selected PDSN upon receiving the PADR packet and before returning the PADS response. The PDSN selection at AP Gateway may be based on algorithms similar to the one's used by the PCF for selecting a PDSN. During the PPPoE Session stage, the AP Gateway performs transparent mapping of PPP frames between the AT and the PDSN based on the PPPoE negotiated Session_ID and the Key field used for the A10-like connection. The CHAP/PAP based authentication may be supported during the PPP link establishment. The PDSN provides AAA-client functions and forwards RADIUS Access-Request message to the AAA server in the home network. On successful authentication, the AAA-Server returns user service profile information in the RADIUS Access-Accept message.

Authentication during MoIP type of service access may be implemented using the Foreign Agent Challenge (RFC 3012) during the registration of MoIP sessions. The PDSN sends the MoIP agent Advertisement messages to the mobile AT when the PPP connection is established. The mobile AT's challenge response received in the MoIP Registration Request message is forwarded to the home-AAA for authentication before allowing MoIP to proceed. The challenge response related inforation is also forwarded to the home agent which can be configured to authenticate the mobile AT again via the home-AAA before allowing the MoIP registration. On successful authentication, an IP address is assigned to the session and the PDSN creates a MoIP service instance for the AT user. Failed registration attempts may be logged and un-trusted users remain blocked from accessing the network.

Authentication during initiation of an application instance can be implemented using the SSL/TLS mechanisms for Web based applications. Each service access by the mobile user is identified by a unique Network Address Identifier (NAI). The FA function at the PDSN may register an entry of such access in the visitor list, thereby associating mobile's home address with the session NAI, care-of-address, home agent, and other identifying information.

The AAA mechanisms also provide unified authorization services framework for both the WLAN and WWAN service accesses. An instance of user service profile is maintained at the AAA-server in subscriber's home network. Successful authentication during PPP establishment results in user service profile being forwarded by the AAA server to the PDSN in RADIUS Access Accept message. Information in the user service profile is used to determine and enforce subscriber service capabilities.

In authentication during wireless link access to the CDMA WWAN, HLR performs mobile/AT authentication based on subscription to different type of services etc. bFor the WLAN type of system access, the IEEE 802.1x based authentication results in the authenticator (AP) authenticating the AT via the authentication server in the home network. Successful authentication results in the AT being allowed to associate with the AP. No service specific authorization information is available to the AP via the AAA framework.

Authentication and authorization during PPP link establishment are based on the PPP supported by the mobile/AT and the PDSN. Successful authentication during PPP establishment results in the mobile/AT being authorized services by the AAA server in the home network. The Home AAA server returns a configured user service profile to the PDSN in the RADIUS Access Accept message. The user service profile includes information that enables the PDSN to enforce service capabilities. The service profile is applicable irrespective of the type of system access and mobility across different access networks.

Authentication during the MoIP type of service access may use the MoIP Challenge/Response Extension (RFC 3012) supported for MoIP based service access, where the authorization profile may already be made available to the PDSN during PPP link establishment. Authorization during initiation of an application instance uses the SSL/TLS mechanisms for Web based applications.

With respect to the accounting part of the AAA, the 3GPP2 P-S0001 accounting model may be used for both the WLAN and CDMA type of service access. For the CDMA type of service access, the RN/PCF and the PDSN together manage accounting parameters. The AP Gateway and the PDSN manage accounting parameters for WLAN type of system access.

Accounting parameters are divided into radio specific parameters and IP network specific parameters. The RN/PCF and the AP Gateway collect and report radio specific parameters to the PDSN. The PDSN collects IP network specific parameters including the volume of data transfer for each user session. The PDSN merges the IP network specific parameters with the radio specific parameters to form one or more Usage Data Records (UDR). The PDSN forwards the merged UDR to the AAA server at configured trigger events by using RADIUS Accounting messages. The PDSN maintains the UDR information until it receives a positive acknowledgment from the RADIUS server. Likewise, the RADIUS server maintains the UDR until the record is delivered to a home RADIUS server, or removed by the operator billing system.

For the WWAN type of service access, the radio specific parameters may include: Mobile Identification information in the form of MSID and ESN, BS and PCF identification information in the form of PCF ID and BSS ID, radio channel capability information in the form of traffic channel type/mux options/airlink QoS etc., and air time usage information. For WLAN type of service access, the radio specific parameters may include: mobile identification information in the form of MAC address and the MSID, AP and AP Gateway identification information in the form of AP ID and the APGW ID, and AT-AP association time information.

In some implementations, the WWAN system may support four types of Airlink Records for communicating radio specific parameters over the PCF-PDSN interface. These records are the R-P Connection Setup Record used when the PCF establishes an R-P connection with the PDSN, the active Start Airlink Record used when the MS has started the use of traffic channel(s), the Active Stop Airlink Record used when the MS has stopped the use of traffic channel(s), and Short Data Burst (SDB) Airlink Record used when a forward or reverse short data burst is exchanged with the MS.

The WLAN system may be configured to support three types of WLANlink records for communicating radio specific parameters over the APGateway-PDSN interface. These records are the R-P-like connection Setup WLANlink Record used when the AP Gateway establishes an R-P connection with the PDSN, the active Start WLANlink Record used when the AT associates with an AP and starts the use of the WLAN airlink, and the Active Stop WLANlink Record used when the AT de-associates with the AP and stops the use of the WLAN airlink. The R-P Connection Setup WLANlink Record includes the WLANLink Record Type=1 (Connection Setup), the R-P Session ID, the WLANLink Sequence Number, and the Serving AP Gateway ID. The active Start WLANlink Record includes the WLANLink Record Type=2 (Active Start), the R-P Session ID, the WLANLink Sequence Number, the Extended Service Set Identifier (ESSID), the BSSID, and the Frequency Channel. The Active Stop WLANlink Record includes the WLANlink Record Type=3 (Active Stop), the R-P Session ID, and the WLANLink Sequence Number.

As part of the accounting function, the PDSN monitors data traffic for the usage byte count, both on the uplink and the downlink separately. The PDSN merges data traffic usage parameters with radio specific parameters and forwards the merged UDR to the AAA server via Accounting-Request messages at appropriate trigger events such as establishment of a user service instance, termination of a user service instance, occurrence of interim accounting record trigger, occurrence of the time-of-day trigger, and when the UDR size crosses a configured value, and other triggers as configured by the service provider.

In the above description of the WWAN-WLAN interworked systems, certain features and functions from various technical standards and specifications are mentioned. Some of such standards and specifications include are:

[1] 3GPP2 C.S0001 Introduction to CDMA2000 Spread Spectrum Systems, Release 0.

[2] 3GPP2 C.S0002 Physical Layer Standard for CDMA2000 Spread Spectrum Systems, Release 0.

[3] 3GPP2 C.S0003 Medium Access Control Standard for CDMA2000 Spread Spectrum Systems, Release 0.

[4] 3GPP2 C.S0004 Signaling Link Access Control Specification for CDMA2000 Spread Spectrum Systems, Release 0.

[5] 3GPP2 C.S0005 Upper Layer Signaling Standard for CDMA2000 Spread Spectrum Systems, Release 0.

[6] 3GPP2 C.S0024_0_v4.0 cdma2000 High Rate Packet Data Air Interface (IS-856).

[7] 3GPP2.C.S0017-0-2 v2.0 Data Service Option for Spread Spectrum System—Addendum 2 (IS-707-A-2).

[8] 3GPP2 A.S0001 3GPP2 Access Network Interface Interoperability Specification.

[9] 3GPP2 A.S0017-0 Interoperability Specification (IOS) for CDMA 2000 Access Network Interfaces □ Part 7 (A10 and A11 Interfaces) 15.

[10] 3GPP2 A.S0007-A v1.0 3GPP2 Interoperatbility Specification (IOS) for High Rate Packet Data (HRPD) Access Network Interface Rev. A.

[11] 3GPP2 P.R0001 Wireless IP Architecture Based on IETF Protocols.

[12] 3GPP2 P.S0001-A Wireless IP Network Standard.

[13] RFC0768 User Datagram Protocol, August 1980.

[14] RFC0791 INTERNET PROTOCOL, September 1981.

[15] RFC0792 INTERNET CONTROL MESSAGE PROTOCOL, September 1981.

[16] RFC 0793 TRANSMISSION CONTROL PROTOCOL, September 1981.

[17] RFC0826 An Ethernet Address Resolution Protocol (ARP), 1982.

[18] RFC0925 Multi-LAN Address Resolution, October 1984.

[19] RFC 1661 The Point-to-Point Protocol (PPP).

[20] RFC 1662 PPP in HDLC-like Framing.

[21] RFC 1701-1702 Generic Routing Encapsulation (GRE).

[22] RFC 1812 Requirements for IP Version 4 Routers, June 1995.

[23] RFC 2002-2006 Mobile IP Related Documents.

[24] RFC 2865 Remote Authentication Dial In User Service (RADIUS).

[25] RFC 2866 RADIUS Accounting.

[26] RFC 2344 Reverse Tunneling for Mobile IP, May 1998.

[27] RFC 2661 Layer Two Tunneling Protocol "L2TP", August 1999.

[28]. RFC 2794 Mobile NAI Extension, March 2000.

[29] RFC 2868 RADIUS Attributes for Tunnel Protocol Support.

[20] RFC 2869 RADIUS Extensions.

[31]. RFC 2888 Secure Remote Access with L2TP, August 2000.

[32] RFC 3012 Mobile IPv4 Challenge/Response Extensions.

[33] RFC 2131 Dynamic Host Configuration Protocol.

[34]. RFC 2153 PPP Vendor Extensions.

[35]. RFC 2284 PPP Extensible Authentication Protocol (EAP).

[36] RFC 2516 A Method for Transmitting PPP Over Ethernet (PPPoE).

[37] IEEE Std. 802.11-1999 Wireless LAN Medium Access Control (MAC) and Physical Layer (PHY) Specifications.

[38] IEEE Std. 802.11b-1999 Wireless LAN Medium Access Control (MAC) and Physical Layer (PHY) Specifications: Higher-Speed Physical Layer Extension in the 2.4 GHz Band.

[39] IEEE Std. 802.11a-1999 Wireless LAN Medium Access Control (MAC) and Physical Layer (PHY) Specifications: High Speed Physical Layer in the 5 GHz Band.

[40] IEEE P802.1x Draft Standards for Local and Metropolitan Area Networks: Standard for Port Based Network Access Control.

Only a few implementations are disclosed. However, it is understood that variations and enhancements may be made without departing from the spirit of and are intended to be encompassed by the following claims.

What is claimed is:

1. A wireless communication system, comprising:
a wireless wide area network (WWAN) having base transceiver stations spatially distributed to communicate with mobile communication devices via WWAN radio links, base station controllers each coupled to a plurality of base transceiver stations, and a data communication system comprising (1) packet control function devices respectively connected to said base station controllers to transmit data packets to and from the mobile communication devices via said base transceiver stations, and (2) a packet data serving node connected to said packet control function devices and a packet data network to provide packet data services to the mobile communication devices;
a wireless local area network (WLAN) having at least one access point (AP) that communicates with a mobile communication device located in an access area via WLAN radio links, and an access point gateway connected between said AP and said packet data serving node to allow for continuity of a packet data service to said mobile communication device by switching a packet data service connection for said mobile communication device between said WLAN and said WWAN; and
a mechanism for authentication, authorization, and accounting (AAA) common to said WWAN and said WLAN.

2. The system as in claim 1, wherein said WWAN is a network under one of CDMA2000 standards and said WLAN is a network under one of IEEE 802.11 protocols.

3. The system as in claim 1, wherein said WWAN operates under the CDMA2000 1xEV-DO.

4. The system as in claim 1, wherein said WWAN operates under the CDMA2000 1x.

5. The system as in claim 1, wherein the WWAN and the WLAN configured to enable each mobile communication device including a WWAN terminal to communicate with a base transceiver station via said WWAN radio links and a WLAN terminal to communicate with an access point via said WLAN radio links.

6. The system as in claim 1, wherein the WWAN and the WLAN further configured to enable each mobile communication device to switch a communication link from one of said WWAN and WLAN to another in response to a link status parameter in said communication link.

7. The system as in claim 6, wherein said link status parameter includes a strength of a signal received from each of said WWAN and WLAN.

8. The system as in claim 6, wherein each mobile communication device includes a WWAN air link device driver to monitor a signal from said WWAN and a WLAN air link device driver to monitor a signal from said WLAN.

9. The system as in claim 1, wherein the WWAN and the WLAN further configured to enable a handoff between said WWAN and said WLAN using a handoff module in each mobile communication device.

10. The system as in claim 9, wherein said handoff is based on the PPPoE protocol.

11. The system as in claim 9, wherein said handoff is based on the DHCP protocol.

12. The system as in claim 9, wherein said handoff interrupts a data link layer during said handoff while maintaining a continuous connection of a packet data service.

13. The system as in claim 1, wherein said access point gateway includes an A10/A11 interface with said PDSN.

14. The system as in claim 1, further comprising at least one AAA server that provides authentication, authorization, and accounting services to said WWAN and WLAN.

15. The system of claim 1, wherein the mechanism operates based on the IEEE 802.1x framework.

16. A communication system, comprising:
a CDMA network coupled to an IP network to provide packet data service to mobile communication devices;
a wireless local area network (WLAN) having at least one access point (AP) that communicates with a mobile communication device located in an access area of said AP, and an access point gateway (APGW) connected between said AP and one packet data serving node in said CDMA network to allow for continuity of a packet data service to said mobile communication device by switching a packet data service connection for said mobile communication device between said WLAN and said CDMA network; and
a mechanism for authentication, authorization, and accounting (AAA) common to said CDMA network and said WLAN.

17. The system as in claim 16, the CDMA network and the WLAN configursd to enable a handoff between said CDMA network and said WLAN using a handoff module in each mobile communication device.

18. The system as in claim 17, wherein said handoff is based on tne PPPoE protocol.

19. The system as in claim 17, wherein said handoff is based on the DHCP protocol.

20. The system as in claim 17, wherein said handoff interrupts a data link layer during a said handoff while maintaining a continuous connection of a packet data service.

21. A method, comprising:
providing an access point gateway between an access point in a WLAN and a packet data service node in a CDMA2000 WWAN to interconnect said WLAN and said WWAN;

using an access terminal that has both a WLAN interface and a interface to communicate with said WLAN and said WWAN;

using a control mechanism in said access terminal to determine which of said WLAN and said WWAN is to be used for a packet data service according to a signal parameter detected by said access terminal;

authenticating, authorizing, and accounting the communication to said WLAN and said WWAN by a mechanism common to said WLAN and said WWAN; and controlling switching between a communication between said WLAN and said WWAN to allow for said access terminal to roam in said WLAN and said WWAN without an interruption to said packet data service.

22. The method as in claim 21, wherein said signal parameter is a signal strength of signals respectively received by said access terminal from said WLAN and said WWAN.

23. The method as in claim 21, wherein said signal parameter is a signal error rate in signals respectively received by said access terminal from said WLAN and said WWAN.

24. The method of claim 21, wherein said mechanism operates based on the IEEE 802.1x framework.

25. The method of claim 21, wherein said switching comprises a handoff between said WWAN and said WLAN.

26. The method of claim 25, wherein said handoff is based on the PPPoE protocol.

27. The method of claim 25, wherein said handoff is based on the DHCP orotocol.

28. A wireless communication system, comprising:
a CDMA network coupled to an IP network to provide packet data service to mobile communication devices; and
a wireless local area network (WLAN) having at least one access point (AP) that communicates with a mobile communication device located in an access area of said AP, and an access point gateway (APGW) connected between said AP and one packet data serving node in said CDMA network to allow for continuity of a packet data service to said mobile communication device by switching a packet data service connection for said mobile communication device between said WLAN and said ODMA network,
wherein the CDMA network and WLAN enable a handoff module in the mobile communication device to switch said packet data service connection.

29. The system of claim 28, further comprising:
a mechanism for authentication, authorization, and accounting (AAA) common to said CDMA network and said WLAN.

30. The system of claim 29, wherein the mechanism operates based on the IEEE 802.1x framework.

31. The system of claim 29, wherein the handoff module operates based on the PPPoE protocol.

32. The system of claim 29, wherein the handoff module operates based on the DHCP protocol.

* * * * *